(12) United States Patent
Kono et al.

(10) Patent No.: US 6,299,790 B1
(45) Date of Patent: Oct. 9, 2001

(54) ELECTRIC DOUBLE LAYER CAPACITOR

(75) Inventors: Michiyuki Kono; Yoshiharu Matsuda, both of Osaka (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/499,589

(22) Filed: Feb. 7, 2000

(30) Foreign Application Priority Data

Mar. 25, 1999 (JP) .................................................. 11-080888

(51) Int. Cl.[7] ...................................................... H05B 5/00
(52) U.S. Cl. ............................ 252/62.2; 361/502; 361/525
(58) Field of Search ........................... 252/62.2; 361/502, 361/525

(56) References Cited

U.S. PATENT DOCUMENTS 5,597,661 * 1/1997 Takeuchi et al. .................... 252/62.2

FOREIGN PATENT DOCUMENTS 62-249361    10/1987    (JP) .
10-7759-A2 *  1/1998    (JP) .

* cited by examiner

*Primary Examiner*—C. Melissa Koslow
(74) *Attorney, Agent, or Firm*—Jordan and Hamburg LLP

(57) ABSTRACT

An electric double layer capacitor capable of functioning over a broad temperature range with a reduced incidence of electrolyte leakage and a low rate of self discharge is formed from a solid electrolyte containing (A) a crosslinking product of a polyoxyalkylene having a double bond terminally and/or in its side chain, (B) an electrolyte salt, (C) a low molecular weight polar solvent, and (D) polyacrylonitrile. The above-mentioned polyoxyalkylene (A) is, for example, a compound of the formula (1) below. In formula (1), Z is an active hydrogen compound residue; k is an integer from 1 to 6; $R^1$ is an alkyl group having 1 to 8 carbon atoms; $Y_1$ is an acryloyl or methacryloyl group; m is an integer from 0 to 460 and n is an integer from 0 to 350, excluding the case in which both m and n are simultaneously equal to 0.

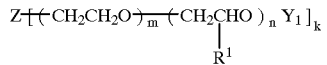

(1)

3 Claims, No Drawings

ELECTRIC DOUBLE LAYER CAPACITOR

TECHNICAL FIELD

This invention relates to an electric double layer capacitor utilizing a solid electrolyte.

BACKGROUND OF THE INVENTION

PRIOR ART

The electrolyte used in the conventional electric double layer capacitor is a liquid electrolyte, that is a solution of an electrolyte salt in a polar medium. The electric double layer capacitor has gained in size in recent years as epitomized by the one used as the auxiliary power source of an electric vehicle and is required to have safety and reliability, among others.

However, an electric double layer capacitor utilizing a liquid electrolyte is liable to develop electrolyte leaks so that its safety and reliability are not necessarily satisfactory. This capacitor further has the disadvantage of a high rate of self discharge.

To overcome those disadvantages, much research has been undertaken into polymer type solid electrolytes in recent years. As such polymer solid electrolytes, a complex between poly(ethylene oxide) and an electrolyte salt and a complex between an ethylene oxide-propylene oxide random copolymer and an electrolyte salt (JP-A-62249361), among others, are known.

However, despite improvements in the incidence of electrolyte leakage and self discharge, such polymer solid electrolytes are seriously deficient in ionic conductivity and ion diffusion rate at low temperatures below room temperature so that when any of them is used in an electric double layer capacitor, only a very low capacitance is obtained at such a low temperature and a high discharge current cannot be obtained even In the ambient temperature.

OBJECT OF THE INVENTION

This invention has for its object to provide an electric double layer capacitor overcoming the above disadvantages, namely one capable of functioning well over a broad range of temperature with a reduced incidence of electrolyte leaks and a low rate of self discharge.

SUMMARY OF THE INVENTION

The electric double layer capacitor of this invention is characterized in that it comprises a solid electrolyte composed of (A) a crosslinking product of a polyoxyalkylene having a crosslinkable double bond terminally and/or in a side chain thereof, (B) an electrolyte salt and (c) a low molecular weight polar solvent.

The electric double layer capacitor utilizing the solid electrolyte of this invention has a discharge capacity comparable to that of the conventional double layer capacitor even at room temperature and, in addition, a low rate of self discharge. Moreover, because the electrolyte is a solid electrolyte, this capacitor has substantially no risk for electrolyte leakage, assuring long-term reliability.

DETAILED DESCRIPTION OF THE INVENTION (A) Polyoxyalkylene

The polyoxyalkylene having a polymerizable double bond, such as an acryloyl or methacryloyl group, terminally and/or in a side chain for use in this invention is not particularly restricted. Preferred, however, is a polymer of the following chemical formula (1) or a polymer of the following chemical formula (2), or a mixture of them, which is capable of holding the low molecular weight polar solvent stably in a large quantity. Polyoxyalkylenes of these respective formulas can be used each independently or as a mixture of two or more species.

The average molecular weight of each polymer is not particularly restricted but is preferably 100 to 3,000,000 and more preferably 200 to 2,000,000.

Formula (1) is as follows:

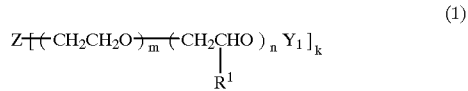

(1)

wherein Z represents an active hydrogen compound residue; k represents an integer of 1 to 6; $R^1$ represents an alkyl group having 1 to 8 carbon atoms; $Y_1$ represents an acryloyl or methacryloyl group; and m represents an integer from 0 to 460 and n represents an integer from 0 to 350, excluding the case in which both m and n are simultaneously equal to 0.

Formula (2) is as follows:

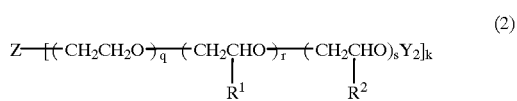

(2)

wherein Z represents an active hydrogen compound residue; k represents an integer from 1 to 6; $R^1$ represents an alkyl group having from 1 to 8 carbon atoms; $R^2$ represents $-CH_2-O-Re^1-Re^2$ wherein $Re^1$ represents $-(CH_2CH_2O)p_1-$ ($p_1$ is equal to 0 or an integer of 1 or more) and $R^2$ represents an alkenyl group; $Y_2$ represents an alkyl group, an aralkyl group, an aryl group, acryloyl or methacryloyl; q represents an integer from 0 to 100,000; r represents an integer from 0 to 50,000; and s represents an integer from 1 to 22,000.

The above polyoxyalkylene can be prepared by subjecting an active hydrogen compound, such as ethylene glycol monomethyl ether, ethylene glycol, glycerol, diglycerol, pentaerythritol or the like, and a monomer, such as ethylene oxide, propylene oxide, allyl glycidyl ether or the like, to addition polymerization reaction and then carrying out an esterification reaction with an unsaturated organic acid, such as acrylic acid or methacrylic acid, a dehydrochlorination reaction using an acid chloride, such as acryloyl chloride, methacryloyl chloride or the like, or a condensation reaction with an alkyl halide or the like.

Crosslinking of said polyoxyalkylene can be effected by ultraviolet irradiation, electron beam treatment or thermal crosslinking, for instance. In this procedure, a polymerization initiator or a sensitizer may be employed where necessary.

(B) Electrolyte Salt

The electrolyte salt for use in this invention is not particularly restricted but includes $LiClO_4$, $LiSCN$, $LiBF_4$, $LiCF_3SO_3$, $LiPF_6$, $LiN(CF_3SO_2)_2$, $LiC(CF_3SO_2)_3$, $LiF$, $LiCl$, $LiBr$, $LiI$, $NaClO_4$, $NsSCN$, $NaBF_4$, $NaPF_6$, $NaCF_3SO_3$, $NaN(CF_3SO_2)_2$, $NaC(CF_3SO_2)_3$, alkali metal salts such as $NaF$, $NaCl$, $NaBr$, $NaI$, etc., quaternary ammonium salts such as $(CH_3)_4NBF_4$, $(CH_3)_4NBr$, $(CH_3)_4NClO_4$, $(C_2H_5)_4NBF_4$, $(C_2H_5)_4NClO_4$, etc., quaternary phosphonium salts such as $(C_2H_5)_4PBF_4$ etc.; and protonic acids such as sulfuric acid, perchloric acid, p-toluenesulfonic acid, etc., to mention preferred examples. Those electrolyte salts may be used in a combination of two or more different species.

The formulating amount of said electrolyte salt, as its concentration in the low molecular weight polar solvent described below, is preferably 0.01 to 3 mol/l, more preferably 0.1 to 1.5 mol/l. If the concentration of the electrolyte salt is less than 0.01 mol/l, the ionic conductivity will be so low that the capacitor may not fully express the desired performance characteristics. Conversely if the electrolyte salt concentration exceeds 3 mol/l, a perturbation will occur in the electric double layer to prevent attainment of a high capacitance.

(C) Low Molecular Weight Polar Solvent

The low molecular weight polar solvent is not restricted to any particular type but includes cyclic esters, cyclic carbonic esters, cyclic ethers, nitriles, lactones, acyclic carboxylic esters, acyclic carbonic esters, sulfolane, sulfolane derivatives, dimethyl sulfoxide and N,N-dimethylformamide, to mention but a few preferred examples.

The molecular weight of such a low molecular weight polar solvent is not particularly restricted but is preferably within the range of 40 to 1,000. If the molecular weight is less than 40, the solvent will be so volatile that it may not be easy to handle. On the other hand, if the molecular weight of the solvent exceeds 1,000, the deceased ionic conductivity of the solid electrolyte will be a problem.

The proportion of the low molecular weight polar solvent in the solid electrolyte should be somewhere between 220 and 1900 weight % based on the weight of the polyoxyalkylene or the sum of the weights of the polyoxyalkylene and polyacrylonitrile. If the proportion of the low molecular weight polar solvent is too small, the ionic conductivity will not be as high as required, with the result that the capacitance of the capacitor at temperatures below room temperature will be insufficient. If the proportion of the low molecular weight polar solvent is too large, the mechanical strength of the solid electrolyte will not be as high as necessary so that the dependability will be sacrificed as, for example, short-circuits occur between the electrodes.

(D) Polyacrylonitrile

Polyacrylonitrile for use is preferably of a molecular weight within the range of 10,000 to 1,000,000. If the molecular weight is less than 10,000, the mechanical strength of the solid electrolyte tends to be low, while the use of polyacrylonitrile with a molecular weight in excess of 1,000,000 may cause the problem of poor processability.

The blending ratio of polyacrylonitrile to polyoxyalkylene is not more than 95%, preferably not more than 80%. If the proportion of polyacrylonitrile exceeds 95%, the solid electrolyte will assume a liquid consistency at high temperature to increase the incidence of short circuits.

Inclusion of polyacrylonitrile offers the advantage that the capacitance of the resulting electric double layer capacitor is somewhat increased.

Others

The electrode material of the electric double layer capacitor according to this invention may for example be an activated carbon or carbon fiber which has a large specific surface area and is inert electrochemically.

EXAMPLES

Example of Synthesis (Synthesis of Polyoxyalkylenes)

The compounds of said formulas (1) and (2), viz. (A-1) to (A-8), were provided by the addition polymerization of a monomer or monomers to various active hydrogen compounds.

Referring to each of those compounds (A-1) to (A-8), Z, the alkylene oxide monomer or monomers, mode of polymerization, terminal group, and molecular weight are presented in Table 1.

TABLE 1

| Compound | | | | | Mode of polymer- | Terminal group | | Molecular |
|---|---|---|---|---|---|---|---|---|
| No. | Z | Monomer | | | ization | Y1 | Y2 | weight |
| A-1 | EGMME | EO: 7 | | | H | A | | 438 |
| A-2 | EG | EO: 20 | | | H | A | | 1050 |
| A-3 | G | EO: 80 | PO: 20 | | R | A | | 8000 |
| A-4 | TMP | EO: 90 | BO: 14 | | R | A | | 5236 |
| A-5 | DG | EO: 110 | PO: 70 | | R | M | | 9338 |
| A-6 | EG | EO: 100 | BO: 20 | AGE: 10 | B | | Methyl | 7056 |
| A-7 | G | EO: 200 | PO: 100 | AGE: 10 | B | | Benzyl | 16120 |
| A-8 | EG | EO: 24000 | PO: 5000 | AGE: 1000 | R | | Methyl | 1460104 |

[Z]
EGMME: Ethylene glycol monomethyl ether residue
EG: Ethylene glycol residue
G: Glycerol residue
TMP: Trimethylolpropane residue
DG: Diglycerol residue
[Monomer]
EO: Ethylene oxide
PO: Propylene oxide
BO: Butylene oxide
AGE: Allyl glycidyl ether
[Mode of polymerization]
H: Homopolymer
R: Random copolymer
B: Block copolymer
[Terminal group]
A: Acryloyl,  M: Methacryloyl Using the above polymers, i.e. Compound No. (A-1) to No. (A-8), electric double layer capacitors were respectively constructed as described in the following examples.

Example 1

An electrode was fabricated by laminating an activated carbon fabric (Toyobo, BW552) having an apparent surface area of 2.17 cm$^2$ and a weight of 44 mg to a nickel current collector through an engineering plastic sheet (Sumitomo Bakelite, FS4654).

On the other hand, 5 g of polymer (A-1) was mixed with 15 g of a solution of tetraethylammonium tetraborofluoride [$(C_2H_5)_4NBF_4$] in γ-butyrolactone (concentration 0.2 mol/l) and, as polymerization initiator, 0.02 g of Irgacure 651 (Ciba-Geigy) to prepare a homogeneous solution. In this solution was Immersed the electrode fabricated above, and the electrode was then taken out and irradiated with UV light (365 nm, 30 mW/cm$^2$) for 3 minutes, whereby the polymer was crosslinked to provide a solid electrolyte layer. Two sheets of the electrode formed with the solid electrolyte layer as above were laminated together, with the electrode layers facing each other, to construct an electric double layer capacitor.

Example 2

Using A-2 as the polymer, propylene carbonate as the low molecular weight polar solvent, and LiBF$_4$ as the electrolyte salt, the procedure of Example 1 was otherwise repeated to provide an electric double layer capacitor.

Example 3

The procedure for fabricating the electrode was exactly the same as in Example 1. Thus, 2 g of polymer (A-3) was mixed with 6 g of polyacrylonitrile having a molecular weight of 100,000, 30 g of a solution of tetraethylammonium tetraborofluoride [$(C_2H_5)_4NBF_4$] in γ-butyrolactone (concentration 0.2 mol/l) and, as polymerization initiator, 0.2 g of Trigonox 151 (Kayaku-Aczo) to prepare a homogeneous solution. In this solution was immersed the electrode prepared above, and the electrode was then taken out and heated for curing at 140° C. for 10 minutes to provide a solid electrolyte layer. Thereafter, the capacitor assembling procedure described in Example 1 was faithfully followed to provide an electric double layer capacitor.

Example 4

The procedure for fabricating the electrode was exactly the same as in Example 1. Thus, 5 g of polymer (A-4) was mixed with 2 g of polyacrylonitrile having a molecular weight of 500,000, 30 g of a solution of tetraethylammonium tetraborofluoride [$(C_2H_5)_4NBF_4$] in γ-butyrolactone (concentration 0.5 mol/l) and, as polymerization initiator, 0.2 g of Trigonox 151 (Kayaku-Aczo) to prepare a homogeneous solution. In this solution was immersed the electrode prepared above, and the electrode was then taken out and heated for curing at 140° C. for 10 minutes to provide a solid electrolyte layer. Thereafter, the assembling procedure described in Example 1 was faithfully followed to provide an electric double layer capacitor.

Example 5

The procedure for fabricating the electrode was exactly the same as in Example 1. Thus, 5 g of polymer (A-5) was mixed with 40 g of a solution of tetramethylammonium tetraborofluoride [$(CH_3)_4NBF_4$] in γ-butyrolactone (concentration 0.1 mol/l) and, as polymerization initiator, 0.02 g of Irgacure 651 (Ciba-Geigy) to prepare a homogeneous solution. In this solution was immersed the electrode fabricated above, and the electrode was then taken out and irradiated with UV light (365 nm, 30 mW/cm$^2$) for 3 minutes, whereby the polymer was crosslinked to provide a solid electrolyte layer. Thereafter, the assembling procedure described in Example 1 was faithfully followed to provide an electric double layer capacitor.

Example 6

The procedure for fabricating the electrode was exactly the same as in Example 1. Thus, 7 g of polymer (A-6) was mixed with 2 g of polyacrylonitrile having a molecular weight of 500,000, 30 g of a solution of tetraethylammonium tetraborofluoride [$(C_2H_5)_4NBF_4$] in propylene carbonate (concentration 1.0 mol/l) and, as polymerization initiator, 0.2 g of Trigonox 151 (Kayaku-Aczo) to prepare a homogeneous solution. In this solution was immersed the electrode prepared above, and the electrode was then taken out and heated for curing at 140° C. for 10 minutes to provide a solid electrolyte layer. Thereafter, the assembling procedure described in Example 1 was faithfully followed to provide an electric double layer capacitor.

Example 7

The procedure for fabricating the electrode was exactly the same as in Example 1. Thus, 7 g of polymer (A-7) was mixed with 50 g of a solution of lithium tetraborofluoride [LiBF$_4$] in γ-butyrolactone (concentration 1.0 mol/l) and, as polymerization initiator, 0.2 g of Trigonox 151 (Kayaku-Aczo) to prepare a homogeneous solution. In this solution was immersed the electrode prepared above, and the electrode was then taken out and heated for curing at 140° C. for 10 minutes to provide a solid electrolyte layer. Thereafter, the assembling procedure described in Example 1 was faithfully followed to provide an electric double layer capacitor.

Example 8

The procedure for fabricating the electrode was exactly the same as in Example 1. Thus, 5 g of polymer (A-8) was mixed with 3 g of polyacrylonitrile, 50 g of a solution of lithium tetraborofluoride [LiBF$_4$] in γ-butyrolactone (concentration 1.5 mol/l) and, as polymerization initiator, 0.2 g of Trigonox 151 (Kayaku-Aczo) to prepare a homogeneous solution. In this solution was immersed the electrode prepared above, and the electrode was then taken out and heated for crosslinking at 140° C. for 10 minutes to provide a solid electrolyte layer. Thereafter, the assembling procedure described in Example 1 was faithfully followed to provide an electric double layer capacitor.

Comparative Example 1

Instead of using a solid electrolyte, a nonwoven fabric saturated with a solution of tetraethylammonium tetraborofluoride [$(C_2H_5)_4NBF_4$] in γ-butyrolactone (concentration 0.2 mol/l) was used as a separator to fabricate an electric double layer capacitor in otherwise the same manner as Example 1.

Comparative Example 2

The procedure for fabricating the electrode was exactly the same as in Example 1. Thus, 5 g of polymer (A-1) was mixed with 0.5 g of tetraethyl ammonium tetraborofluoride [$(C_2H_5)_4NBF_4$] and, as polymerization initiator, 0.02 g of Irgacure 651 (Ciba-Geigy) to prepare a homogeneous solution. In this solution was immersed the electrode prepared above, and the electrode was then taken out and irradiated with UV light (365 nm, 30 mW/cm$^2$) for 3 minutes, whereby the polymer was crosslinked to provide a solid electrolyte layer. Thereafter, the assembling procedure described in Example 1 was faithfully followed to provide an electric double layer capacitor.

Comparative Example 3

The procedure for fabricating the electrode was exactly the same as in Example 1. Thus, 5 g of polymer (A-8) was mixed with 0.5 g of lithium tetraborofluoride [LiBF$_4$] and, as polymerization initiator, 0.05 g of Trigonox 151 (Kayaku-Aczo) to provide a homogeneous solution. In this solution was immersed the electrode prepared above, and the electrode was then taken out and heated for crosslinking at 140° C. for 10 minutes to provide a solid electrolyte layer. Thereafter, the assembling procedure described in Example 1 was faithfully followed to provide an electric double layer capacitor.

Evaluation of Electric Double Layer Capacitors

The electric double layer capacitors constructed above in Examples and Comparative Examples were evaluated. The capacitance at room temperature was measured by charging with a constant current (1 mA) up to 2 V and discharging down to 1 V.

The self discharge characteristic at room temperature was evaluated by charging under the same conditions as above, bringing the capacitor into open-circuit state, and measuring the time till voltage drop to 1 V.

The results of capacitance measurement are shown below in Table 2 and the results of evaluation of self discharge characteristic are shown in Table 3.

TABLE 2

Results of discharge capacity measurement

| | Discharge capacity ($\mu$F/cm$^2$) |
|---|---|
| Example 1 | 0.74 |
| Example 2 | 0.76 |
| Example 3 | 0.78 |
| Example 4 | 0.77 |
| Example 5 | 0.72 |
| Example 6 | 0.75 |
| Example 7 | 0.77 |
| Example 8 | 0.73 |
| Compar. Example 1 | 0.77 |
| Compar. Example 2 | 0.10 |
| Compar. Example 3 | 0.05 |

TABLE 3

Results of evaluation of self discharge characteristic

| | Time till voltage drop to 1 V (hrs) |
|---|---|
| Example 1 | 190 |
| Example 2 | 180 |
| Example 3 | 210 |
| Example 4 | 225 |
| Example 5 | 195 |
| Example 6 | 211 |
| Example 7 | 186 |
| Example 8 | 228 |
| Compar. Example 1 | 30 |
| Compar. Example 2 | 195 |
| Compar. Example 3 | 200 |

What is claimed is:

1. An electric double layer capacitor comprising a solid electrolyte wherein said solid electrolyte comprises:

(A) a crosslinking product of a polyoxyalkylene having a crosslinkable double bond terminally and/or in a side chain thereof;

(B) an electrolyte salt;

(C) a low molecular weight polar solvent; and (D) a polyacrylonitrile.

2. An electric double layer capacitor comprising a solid electrolyte wherein said solid electrolyte comprises:

(A) a crosslinking product of a polyoxyalkylene having a crosslinkable double bond terminally and/or in a side chain thereof and the crosslinking product of a polyoxyalkylene is represented by formula (1):

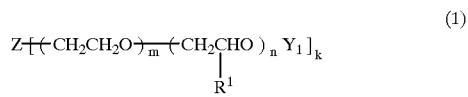

(1)

wherein Z is an active hydrogen compound residue;

k is an integer of 1 to 6;

R$^1$ is an alkyl group having 1 to 8 carbon atoms;

Y$_1$ is an acryloyl or methacryloyl group; and m is an integer from 1 to 460 and n is an integer from 1 to 350;

(B) an electrolyte salt; and (C) a low molecular weight polar solvent.

3. An electric double layer capacitor comprising a solid electrolyte wherein said solid electrolyte comprises:

(A) a crosslinking product of a polyoxyalkylene having a crosslinkable double bond terminally and/or in a side chain thereof and the crosslinking product of a polyoxyalkylene is represented by formula (2):

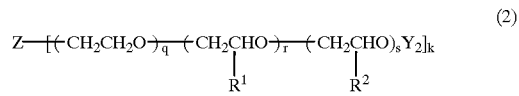

(2)

wherein Z is an active hydrogen compound residue;

k is an integer from 1 to 6;

R$^1$ is an alkyl group having from 1 to 8 carbon atoms;

R$^2$ is —CH$_2$—O—Re$^1$—Re$^2$ wherein Re$^1$ is —(CH$_2$CH$_2$O)p$_1$—, p$_1$ is an integer of 0 or greater and Re$^2$ is an alkenyl group;

Y$_2$ is an alkyl group, an aralkyl group, an aryl group, acryloyl or methacryloyl;

q is an integer from 0 to 100,000;

r is an integer from 0 to 50,000; and s is an integer from 1 to 22,000;

(B) an electrolyte salt; and (C) a low molecular weight polar solvent.

* * * * *